United States Patent
Shifris et al.

(10) Patent No.: US 7,153,142 B2
(45) Date of Patent: Dec. 26, 2006

(54) RETROFIT KIT FOR INTERCONNECT CABLING SYSTEM

(75) Inventors: Pinhas Shifris, Tel Aviv (IL); Yaakov Haggay, Kfar Saba (IL)

(73) Assignee: RIT Technologies Ltd., Tel Aviv (IL)

( * ) Notice: Subject to any disclaimer, the term of this patent is extended or adjusted under 35 U.S.C. 154(b) by 31 days.

(21) Appl. No.: 10/534,271

(22) PCT Filed: Nov. 11, 2003

(86) PCT No.: PCT/IL03/00944

§ 371 (c)(1),
(2), (4) Date: May 9, 2005

(87) PCT Pub. No.: WO2004/044599

PCT Pub. Date: May 27, 2004

(65) Prior Publication Data

US 2006/0063406 A1     Mar. 23, 2006

(30) Foreign Application Priority Data

Nov. 11, 2002  (IL) .................................... 152768

(51) Int. Cl.
*H01R 29/00*  (2006.01)
(52) U.S. Cl. .............. 439/49; 439/490; 439/719; 700/200; 361/796
(58) Field of Classification Search ............... 439/490, 439/49, 719; 361/796; 709/200
See application file for complete search history.

(56) References Cited

U.S. PATENT DOCUMENTS

| 5,483,467 A | | 1/1996 | Krupka et al. |
| 5,997,311 A | * | 12/1999 | Crouse et al. ............. 439/49 |
| 6,163,595 A | * | 12/2000 | Parker et al. ............. 379/22 |
| 6,285,293 B1 | | 9/2001 | German et al. |
| 6,688,910 B1 | * | 2/2004 | Macauley ............. 439/491 |
| 6,994,561 B1 | * | 2/2006 | Pepe ............. 439/49 |

FOREIGN PATENT DOCUMENTS

| EP | 0 575 100 A | 12/1993 |
| EP | 0 849 602 A | 6/1998 |
| FR | 2 680 067 A | 2/1993 |
| WO | WO 00/60475 A | 10/2000 |
| WO | WO 02/39756 A | 5/2002 |

OTHER PUBLICATIONS

Grimes G. J: "Backplane Indicators" Technical Digest—AT and T Technologies, AT and T Technologies Inc New York, US, No. 77, Oct. 1, 1985, p. 29.
International Search Report from PCT/IL0300944.

* cited by examiner

*Primary Examiner*—Truc Nguyen
(74) *Attorney, Agent, or Firm*—Pearl Cohen Zedek Latzer, LLP

(57) ABSTRACT

System and method for automatically obtaining the connectivity status, or map, of a cabling system in data and/or voice networks are disclosed. A suitable retrofit kit for this purpose comprises a plurality of upgraded patch cords for replacement of respective used patch cords through which scanning signals are forwarded by a scanning system and a plurality of adapter panels attached to a respective patch panel that includes for a connectivity status indicator and an electrical contact for mating with the corresponding electrical scanning contact of an upgraded patch cord. Scanning signals received by an electrical contact are processed to generate data that represents the current connectivity status, or map, of the cabling system. A plurality of adapter plugs for initializing the scanning system by a first connectivity status, or map, is also provided. Cabling system management is effected with the first and current connectivity status, or map.

20 Claims, 6 Drawing Sheets

RETROFIT KIT FOR INTERCONNECT CABLING SYSTEM

CROSS-REFERENCE TO RELATED APPLICATIONS

This application is a National Phase Application of PCT International Application No. PCT/IL2003/000944, International Filing Date Nov. 11, 2003, claiming priority of IL Patent No. 152768, filed Nov. 11, 2002.

FIELD OF THE INVENTION

The present invention relates to the field of interconnecting cabling systems of data networks. More particularly, the present invention relates to a retrofit kit and related method for allowing managing interconnecting cabling systems lacking managing capability. The present invention also relates to an adapter plug for allowing updating an existing database, or, alternatively, for generating a database, the database being associated with the management of a corresponding interconnecting cabling system.

BACKGROUND OF THE INVENTION

The term 'retrofit kit' refers to a combination of new components and/or parts and/or equipment and/or hardware, which is mechanically and/or electronically adapted to work with a conventional system or apparatus, for imparting it new features.

The term 'managing' (i.e., in connection with 'management of interconnecting cabling systems') encompasses operations such as obtaining, and/or monitoring the connectivity status, or map, of a cabling system, and using the obtained data for guiding a person through desirable cabling changes and for indicating to said person erroneous connections, if any.

The term 'Patch Panels' refers to panels that include data ports, to which multiconductor cables (hereinafter referred to as 'Patch Cords') may be connected, and which are associated with interconnecting cabling systems.

The term 'Connectivity' is used in connection with one or more patch cords that are connected to corresponding sockets in patch panels, so as to allow transmission of data and/or voice between pairs of sockets. The data/voice could be represented by corresponding analog or digital signals. Accordingly, 'Connectivity Status', or 'Connectivity Map', is a type of data that indicates the end of which patch cord (i.e., terminated by a corresponding plug) is connected to which socket in which patch panel. The data, or voice, associated with the connectivity status/map is normally contained within a storage array, for example, in a database.

The term 'Scanning System' refers to a system designed for transmitting signals (hereinafter referred to as 'Scanning Signals'—SSIGs) via the first end of patch cords that are connected to sockets in patch panels, receiving the SSIGs at the corresponding second end, and associating each first end with its corresponding second end. In other words, the scanning system forwards SSIGs to a first set of ends of patch cords, and receives the forwarded SSIGs via a corresponding second set of ends of patch cords, for associating each end from the first set to a corresponding end of the second set. The scanning system may contain a database, the content of which is a data representing the connectivity status or connectivity map of the respective (i.e., scanned) cabling system, updated according to the transmission of the SSIGs. A scanning system is described, for example, in U.S. Pat. No. 5,483,467 ("Patching panel scanner").

The term 'socket suitable for transmission of scanning signals' refers to a socket (i.e., data/voice port) that includes, in addition to data/voice contacts, an integral electrical scanning contact(s), being normally physically aligned with the data/voice contacts, and via which, scanning signals could be transmitted by a scanning system. The functionality of the latter type of socket is equivalent to the functionality of a combination that comprises a socket that is not suitable for transmission of scanning signals, and an electrical scanning contact that is located outside the respective socket and utilized by a scanning system to forward scanning signals. A scanning contact, which is included in a plug and is intended to mate with an integral electrical scanning contact, is hereinafter referred to as 'internal scanning contact'. A scanning contact that is part of a plug and is intended to mate with an electrical scanning contact that is located outside the respective socket, is hereinafter referred to as 'external scanning contact'.

Currently, there is a large number of interconnecting cabling systems being used, which are usually based on cross-connecting/interconnecting patch panels that utilize sockets as data ports, and corresponding patch cords. The latter sockets, and associated cords' plugs, may be conventional or non-conventional, and each socket may include any number of electrical contacts. In order to facilitate the description associated with patch panel connections, the respective description refers to exemplary sockets and patch cords, each of which has 8-contacts and 8-wires, respectively, which are utilized for data transfer. An example for such patch panel and patch cord is shown in FIG. 1, in the specification. In FIG. 1(*a*), patch panel 37 includes 8-contact sockets 37/1 to 37/24. FIG. 1(*b*) depicts plug 3, which has eight contacts (6) and is mounted at a first end of patch cord 31. Cabling systems that include patch panels, such as patch panel 37, are problematic in terms of tracking their connectivity status, since they do not provide means, such as (scanning) wires and electrical contacts, for allowing a Scanning System to forward SSIGs via the connected patch cords, and, thereby, to obtain data associated with their connectivity status.

Consequently, the problematic patch panels cannot be monitored nor managed, which causes several forthcoming drawbacks whenever large interconnecting cabling systems are involved, due to the relatively high degree of randomness characterizing the physical arrangement of the connected patch cords. A first drawback is associated with the fact that the recordation, reflecting the patch cords connectivity status, must be manually updated. Such updating is very cumbersome and may result in erroneous connectivity recordation. A second drawback involves manual changing of cables' connectivity. In such cases, a person might accidentally disconnect a wrong patch cord, in which case an unintended data network would be disconnected, since normally, when there are many patch cords aggregated in relatively small area, it is difficult to associate the first end of a patch cord with its second end.

A partial solution to the above mentioned problem is described in WO 00/60475, which discloses an adapter jacket having an external contact, which is placed over a standardized cable (FIG. 1B, in the reference, reference numerals 7, 8 and 3, respectively) which connects data ports, and an adapter board having a plurality of socket contacts (FIG. 2, in the reference, reference numerals 14, 15, respectively). However, the system disclosed in WO 00/60475 suffers from a major drawback in that is associated with the external conductor wire (FIG. 1B, reference numeral 9, in the reference) that must be externally added to each one of the connecting cables. The external conductor wire could be freely moved by a person, intentionally or unintentionally, regardless of the physical orientation of the connected patch cord to which it is added. Such movements might cause to disconnection of the external conductor. Furthermore, in a system having already a relatively large number of interconnecting cables, adding additional conductors could make the cabling system even more difficult to handle and manage. The latter problem could be partially solved by securing the external conductors to their corresponding patch cord. However, such an arrangement is provisory-like solution and implementing it requires human work that could be time-consuming. A second drawback is associated with the external contact attached to the adapter boot (FIG. 1B, reference numerals 8 and 7, respectively, in the reference) i.e., special care must be given to the placing of adapter boot 7, as it must be tightly attached to the corresponding counter socket contact in order to maintain the electrical continuity of the scanning path.

In addition, the disclosed system is incapable of interacting with a technician whenever there is a desire to add new patch cords or to change the location of existing patch cords means. For example, it would be advantageous to have a system that, whenever required, will guide a technician (e.g., by activating a corresponding flashing Light Emitting Diode—LED) as for the next data port(s), or data socket, to which a patch cord end(s) should be connected. It would be also advantageous to have a system that, whenever required, will detect errors that are made in connecting patch cord ends to data ports, and indicate to the technician the erroneous connections.

The system described above has not provided a simple and reliable way for managing cabling systems, which offers also a way for interactive operation with a corresponding cabling system's manager.

It is an object of the present invention to provide means for obtaining the connectivity status, or map, of data ports included in patch panels, which utilize sockets and associated connecting patch cords, by utilizing scanning conductors that are included in the connecting patch cords.

It is another object of the present invention to provide a kit for allowing easy identification of a data port to which an end of a corresponding connecting cable should be connected.

It is a further object of the present invention to provide a kit for allowing easy identification of a data port from which an end of a corresponding connecting cable should be removed.

It is still another object of the present invention to provide means for guiding a technician through 'error-free' interconnection changes, which may include replacements, addition, or removal, of new or existing connecting patch cords, respectively.

It is still another object of the present invention to provide a kit for allowing to obtain indications associated with erroneous connections.

It is yet another object of the present invention to provide an adapter plug for allowing to initiate an existing database or generate a new database, the database being associated with a corresponding connectivity data that is used for replacing patch cords by patch cords (i.e., upgraded patch cords) suitable for managing cable connectivity.

It is yet another object of the present invention to provide a patch cord for allowing interconnecting between socket(s) suitable for transmission of scanning signals and sockets of upgraded patch panels.

It is yet another object of the present invention to provide a patch cord that includes plugs for allowing interconnecting between socket(s) suitable for transmission of scanning signals.

Other objects and advantages of the invention will become apparent as the description proceeds.

SUMMARY OF THE INVENTION

The present invention is directed to an adapter panel and Upgraded Patch Cords (UPCs), for allowing to automatically obtain the connectivity status, or map, of a cabling system in data networks, which includes patch panels, each of which may contain conventional and/or non-conventional sockets, being data or voice ports, to which one or more patch cords are connected, and for allowing to utilize the obtained connectivity status, or map, for managing said cabling system. The present invention is also directed to plurality of pairs of adapter plugs, which are intended to work in combination with said adapter panel and patch cords, for assisting in replacing said patch cords with respective UPCs.

According to a first aspect of the present invention, a new system is provided, which comprises the patch panels of the existing cabling system and a retrofit kit. The retrofit kit comprises a plurality of new adapter panels and a plurality of new Upgraded Patch Cords (UPCs). The UPCs are intended to replace patch cords that are used by the cabling system. In addition, the retrofit kit may also comprise a plurality of pairs of adapter plugs, which would allow to generate a database that will contain data related to the initial, or first, connectivity status, or map, of the existing cabling system (i.e., the connectivity status of the cabling system prior to the replacement of the patch cords by corresponding UPCs), for determining which patch cords are to be replaced by the corresponding UPCs. After completion of the replacement, the database will be utilized for managing the cabling system with the UPCs.

Each one of the UPCs replaces a respective used patch cord, and includes, in addition to data/voice wires, an internal scanning wire, and to each one of the UPC's ends is connected an upgraded plug. Each one of the upgraded plugs includes, in addition to data/voice contacts, an electrical scanning contact, which is in electrical contact with the corresponding internal scanning wire. Consequently, each one of the UPCs includes a scanning path, which consists of the UPC's internal scanning wire and two electrical scanning contacts to which the internal scanning wire is connected, via which scanning signals may be forwarded by a scanning system. An upgraded plug may have one or more electrical scanning contacts that may be externally and/or internally integrated to the upgraded plug, in which case the internal and external electrical scanning contacts are electrically connected to the same internal scanning wire (i.e., contained within the respective UPC).

Each one of the patch panels includes n sockets (normally n=24, but the value of n may be different for different patch panels), and each one of the adapter panels is adapted to work in combination with the respective patch panel and includes, for any given socket in the respective patch panel, a Connectivity Status Indicator (CSI) and a Spring Electrical Contact (SEC). Each one of the SECs is intended to be utilized for transmitting scanning signals (i.e., to a corresponding scanning path) that are forwarded to the SEC from a scanning system, or for receiving scanning signals from a corresponding scanning path and forwarding the received scanning signals to the scanning system, whereby the received scanning signals are interpreted for generating a data that represents the current connectivity status, or map, of the cabling system. In order to allow the transmission and receiving of the scanning signals, the SECs mate with the respective external scanning contacts; i.e., whenever a UPC is connected, via its upgraded plugs, to the corresponding sockets in the respective patch panels. The flexibility of the spring electrical contact ensures electrical continuity with the respective external scanning contact. However, the spring electrical contact may be replaced by rigid electrical contact, in which case the corresponding external scanning contact could be replaced by a corresponding flexible contact, in order to ensure electrical continuity between the rigid electrical contact and the flexible contact.

Whenever required, the scanning system forwards indication signals to the respective Connectivity Status Indicators (CSIs). The indication signals are 'guiding' signals that indicate, whenever a connectivity change is required in upgraded patch cords used by the cabling system, from or to which socket(s) a used upgraded patch cord should be disconnected or connected, respectively, and, whenever a new upgraded patch cord should be added to the cabling system, to which sockets the new upgraded patch cord should be connected.

Preferably, each adapter panel includes a Printed Circuit Board (PCB), on which the spring electrical contacts and CSIs are installed, and the PCB is connected to the scanning system via a flat cable, which allows the scanning system to transmit and forward scanning signals and guiding signals, respectively. Of course, the CSI may be, e.g., a Light Emitting Diode (LED).

The present invention is also directed to a method for automatically obtaining the connectivity status/map of a cabling system, for utilizing the obtained connectivity status/map for identifying erroneous connections, or disconnections, and for guiding a person through wanted connectivity changes. The method involves providing UPCs and adapter panels in a way that to each one of the patch panels is attached an adapter panel, and some, or all, of the patch cords, which are connected to sockets of the patch panels (i.e., patch cords used by the cabling system), are replaced by respective UPCs (i.e., on a 'one-for-one' basis), and causing a scanning system, which is connected to the adapter panel, to transmit scanning signals via the corresponding SECs and respective scanning paths, and processing, by the scanning system, the signals that are received by the opposite corresponding SECs. The method preferably includes providing a plurality of adapter plugs for initializing the scanning system by obtaining the initial connectivity status or map of the cabling system prior the replacement of the patch cords by corresponding UPCs.

Preferably, the method comprises the following steps:
a) Providing a plurality of adapter panels. Each one of the adapter panels is attached to the respective patch panel, and includes, for any given socket that is included in the patch panels, a Spring Electrical Contact (SEC) and a Connectivity Status Indicator (CSI). The SEC is intended to mate with a respective external scanning contact, for allowing transmitting/receiving corresponding scanning signals via the respective external scanning contact, and the Connectivity Status Indicator (CSI) is intended to indicate changes that are required in the connectivity status, and/or erroneous connections or disconnections, by forwarding, by a scanning system, corresponding guiding and/or error signal;
b) Replacing some, or all, of the patch cords by corresponding Upgraded Patch Cords (UPCs). Each one of the UPCs includes an internal scanning wire. Each one of the internal scanning wire's ends is in electrical contact with a respective external electrical contact that is included in upgraded plug that is connected to the respective UPC's end. The scanning wire and corresponding two external electrical contacts form a scanning path, via which scanning signals could be forwarded;
c) Transmitting scanning signals from the scanning system to a first set of SECs, according to a predetermined schedule. The scanning signals are forwarded from the SECs to the respective scanning paths;
d) Receiving the scanning signals from the scanning paths by a second set of respective SECs, and forwarding the received scanning signals to the scanning system;
e) Processing the received scanning signals. The processing includes identifying the first and second ends of each one of the connected/used UPCs, and generating and storing a first data that represents the current connectivity status or map of the cabling system; and
f) Continuously, or whenever required, repeating steps c) to e). The transmission and interpretation of the scanning signals may be carried out automatically or manually, and essentially according to any chosen schedule. For example, the transmission of the scanning signals may be periodic.

The method preferably further includes obtaining an initial connectivity status/map (i.e., prior to the replacements of patch cords by respective UPCs), by temporarily utilizing data wires, which are included in the respective patch cords used by the cabling system, as scanning wires, via which scanning signals will be forwarded. The initial connectivity status, or map, is intended to be utilized by the scanning system for replacing the patch cords by respective upgraded patch cords. Accordingly, there is provided a temporary system, which comprises patch panels of the existing cabling system, adapter panels, such as the adapter panel described above, patch cords and a plurality of pairs of adapter plugs, which are mechanically and electrically adapted to work in combination with the respective adapter panels and patch cords that are used by the cabling system, and are intended to be replaced by respective UPCs.

To each connected patch cord is attached a pair of adapter plugs, first by disconnecting one of its ends from the respective socket, after which the disconnected end is mated with a first end of an adapter plug, the second end of which is mated with the respective socket, and then, by repeating the latter process for the other end of the connected patch cord.

Each one of the adapter plugs consists of an adaptation socket (i.e., the first end of the adapter plug) and an adaptation plug (i.e., the second end of the adapter plug), and further includes an external scanning electrical contact, which is electrically connected to an internal electrical contact contained within the adaptation socket. The shape and functionality of the external scanning electrical contact that is included in the adapter plug is identical to the shape and functionality of the external scanning electrical contact that is included in the upgraded plug that is described above. However, in this case, the external scanning contact, which is included in the adapter plug, is intended to electrically interact, via the corresponding internal electrical contact, with a conductor that is selected from data conductors that are included in the patch cord to which the adapter plug is attached. The selected data conductor is intended to be a part of a scanning path (i.e., to be utilized as a scanning wire) that comprises also the external electrical contacts and the internal electrical contacts, that are associated with the same scanning wire.

The connectivity status/map of the patch cords used by the cabling system is obtained in the same manner as described in connection with the UPCs. After obtaining the (first/initial) connectivity status of the cabling system, the adapter plugs and patch cords are removed from the cabling system and replaced by the respective UPCs.

Preferably, whenever the initial, or first, connectivity status, or map, is required, the following steps are performed:

a) For each one of the patch cords that is used by the cabling system, mating an adapter plug to each one of the plugs that are connected to its ends. The adapter plug consists of an adaptation plug and an adaptation socket and it further includes an external scanning contact that is electrically connected to an internal contact of said adaptation socket;

b) Utilizing, in each one of the patch cords, a data wire as a scanning wire, which is electrically connected, via the corresponding internal contacts, to the corresponding external scanning contacts, for allowing transmitting or receiving scanning signals, via a respective scanning path, which comprises the scanning wire, two corresponding internal contacts and external contacts of the respective adapter plug;

c) Transmitting scanning signals from the scanning system to a third set of SECs, according to a predetermined schedule. The scanning signals are forwarded from the SECs to the respective scanning paths;

d) Receiving the scanning signals from the scanning paths by a fourth set of respective SECs, and forwarding the received scanning signals to the scanning system;

e) Processing, by the scanning system, the received scanning signals. The interpretation includes identifying the first and second ends of each one of the connected/used patch cords, and generating and storing initial data that represents the current initial connectivity status, or map, of the cabling system;

f) Disconnecting the adapter plugs, and patch cords, from the cabling system; and g) Causing the scanning system to forward guiding signals to the respective CSIs, according to the stored first data, for indicating to a person the sockets to which UPC(s) is (are to be connected.

Preferably, the method for identifying erroneous connections, or disconnections, includes the following steps:

a) Comparing the first stored data with a second stored data that represents the wanted connectivity status, for allowing identifying unwanted changes (i.e., connection errors) in the connectivity status or map. The wanted connectivity status may be obtained by connecting (i.e., by a person) UPCs to corresponding sockets, employing the scanning system and indicating to the scanning system that the scanning results represent the wanted connectivity status. Alternatively, the wanted connectivity status may be represented by a corresponding data that is pre-stored in a corresponding storage array; and b) Whenever an unwanted change(s) in the connectivity status is (are) identified, sending corresponding error signal(s) to the respective CSI(s).

Preferably, the method for guiding a person through wanted changes (i.e., in the connectivity status) includes utilization of a pre-stored data, which represents the wanted new connectivity status, for causing the scanning system to forward guiding signals, according to wanted order, to the respective CSIs. The wanted order may be predetermined either by a person who actually makes the physical changes in the connectivity status, or by the scanning system.

Preferably, the next scheduled CSI (i.e., the next CSI to be activated), which is related to the next scheduled change, will not be activated unless the current connectivity change is successfully completed.

Preferably, in order to determine whether a connectivity change is successfully completed, the scanning system forwards scanning signals and checks, by employing comparison process, whether the actual current change matches the expected (i.e., scheduled) current change. In the event of mismatch, the scanning system will forward corresponding error signal(s). Otherwise, the next scheduled CSI will be activated by the scanning system. The latter process will be repeated until completion of the wanted changes in the connectivity status.

The data representing the connectivity status/map may reside within a storage means, such as a storage array or a database. The storage means may reside within the scanning system or be external (i.e., external storage means) to the scanning system, in which case the scanning system will have to communicate with the external storage means in order to allow, whenever required, retrieving data from the external storage means (i.e., which will be utilized as guiding signals) and updating of the content of the external storage means with connectivity changes, whenever such changes are identified by the scanning system.

The scanning system may be configured to transmit scanning signals either automatically, in accordance with a predetermined schedule, or manually, and to identify accidental disconnection of UPCs, by comparing new scanning results with previous scanning results, or with stored data that represents (the) wanted connectivity status.

The present invention also includes an adapter panel for allowing, in combination with patch panels and UPCs, or patch cords, to obtain a connectivity status of a cabling system. The components and functionality of the adapter panel are described above.

The present invention also refers to an adapter plug for allowing, in combination with patch panels and patch cords, to obtain an initial connectivity status of a cabling system. The structure and functionality of the adapter plug are described above.

BRIEF DESCRIPTION OF THE DRAWINGS

The above and other characteristics and advantages of the invention will be better understood through the following illustrative and non-limitative detailed description of preferred embodiments thereof, with reference to the appended drawings, wherein.

DETAILED DESCRIPTION OF PREFERRED EMBODIMENTS

The invention is directed to a retrofit kit, preferably including an adapter plug, and related method for allowing managing non-manageable cabling systems. In particular, the invention is directed to a retrofit kit and method for allowing easy management of non-manageable cabling systems after replacement of connected patch cords by UPCs.

Figure 1A:
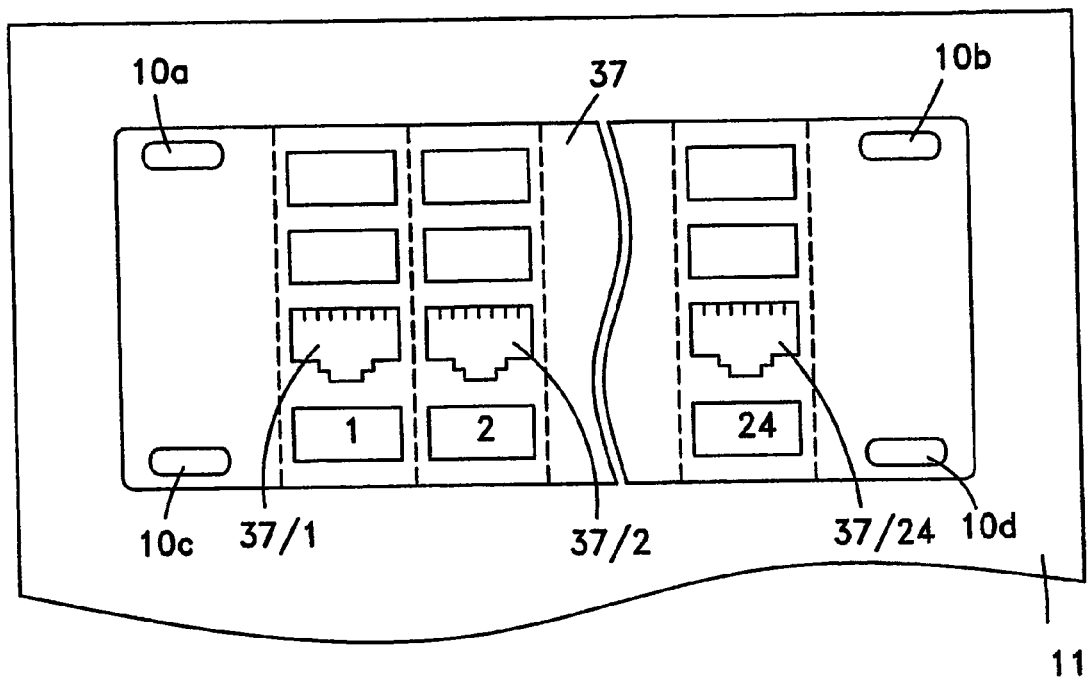
FIG. 1A (prior art) illustrates an exemplary patch panel often used in cabling systems.
Figure 2A:
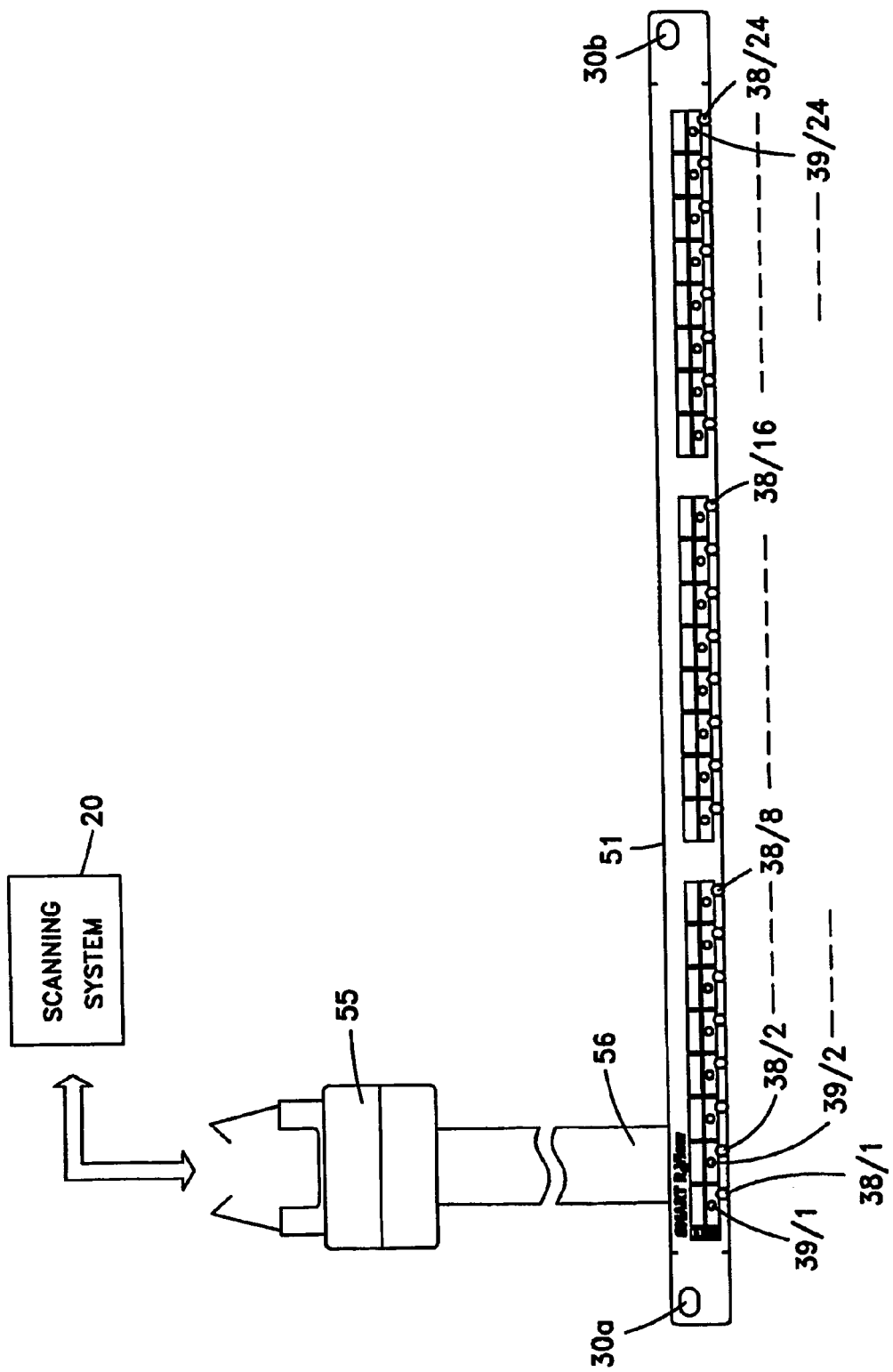
FIG. 2A schematically illustrates the front view of an adapter panel, according to a preferred embodiment of the present invention.

FIG. 2A schematically illustrates the front side view of an adapter panel, according to a preferred embodiment of the present invention. Adapter panel 51 comprises spring electrical contacts 38/1 to 38/24 and indication means 39/1 to 39/24 (hereinafter referred to as 'Connectivity Status Indicators'—CSIs), each of which is associated with a corresponding socket 37/1 to 37/24 (see FIG. 1a), flat cable 56, connector 55 and two 'holes', 30a and 30b, for allowing mounting adapter panel 51 on patch panel 37 (FIG. 1a). Each one of spring electrical contacts 38/1 to 38/24 is intended to allow transmitting and/or receiving corresponding Scanning Signals (SSIGs), from/by scanning system 20, and, thereby, to allow scanning system 20 to identify the connectivity status of patch panel 37 (FIG. 1a). CSIs could be utilized by scanning system 20 to guide a technician through the interconnectivity changes, which might include changes in existing interconnections, additions of new patch cords, or removal of existing patch cords.

Figure 2B:
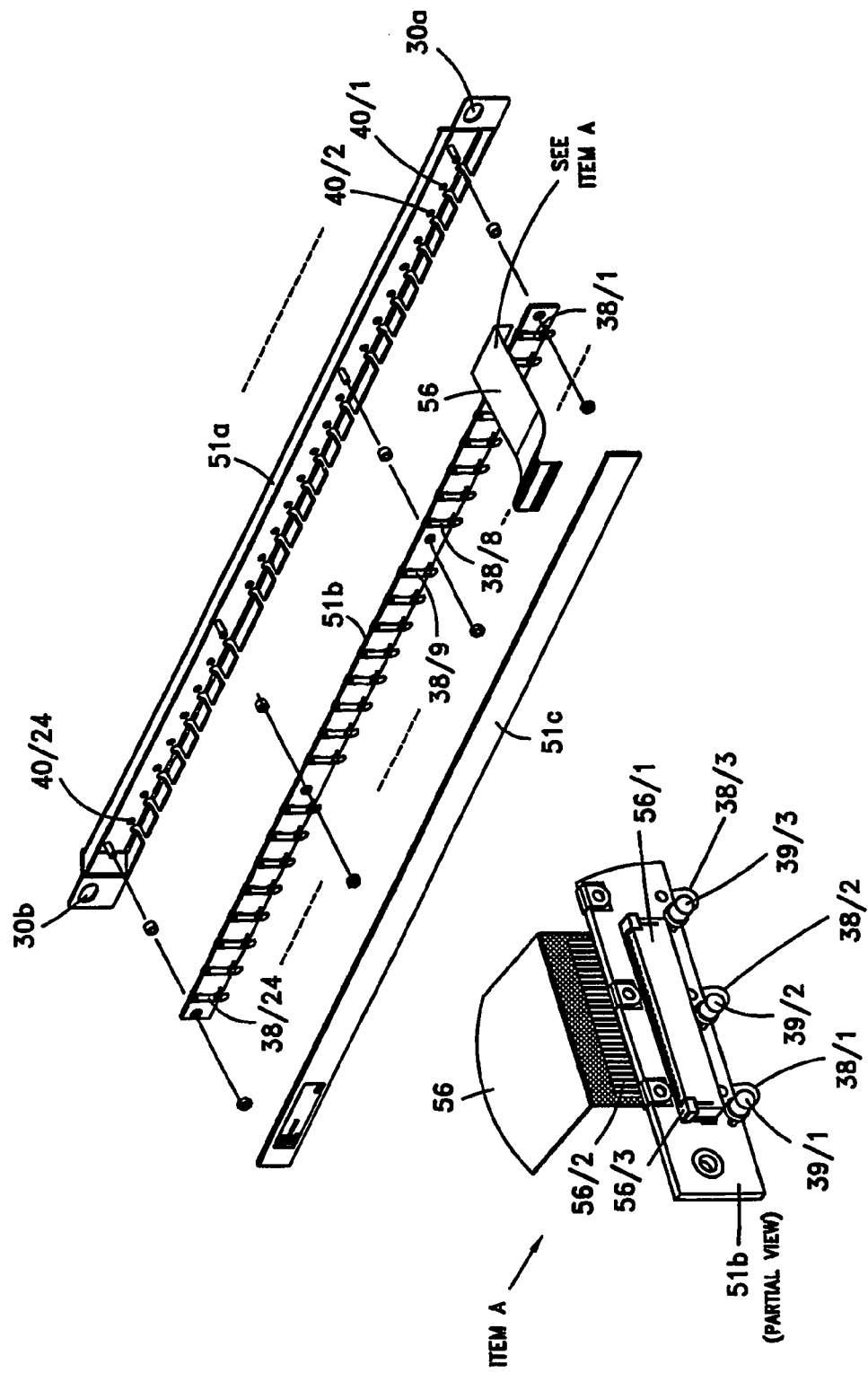
FIG. 2B is an assembly drawing of the adapter panel shown in FIG. 2A.

FIG. 2B is an assembly drawing of the adapter panel shown in FIG. 2A. Reference numerals 38/$i$ (i=1 to 24) designate the spring electrical contacts. Reference numerals 39/$i$ (i=1 to 24) designate the Connectivity Status Indicators (CSIs). Reference numerals 40/$i$ (i=1 to 24) designate the openings for accepting the respective CSIs. Reference numeral 51$b$ illustrates the Printed Circuit Board (PCB) assembly, on which CSIs 39$i$ (see, for example, CSIs 39/1 to 39/3, in item 'A', in FIG. 2B), spring electrical contacts 38$i$ and flat cable 56, are assembled. PCB assembly 51$b$ is secured between front side panels 51$a$ and 51$c$. Of course, the number of CSIs and spring electrical contacts, which are included in a given adapter panel, matches the number of the sockets that are included in the patch panel on which the adapter panel is attached.

Item 'A' shows a partial (and magnified) view of PCB assembly 51$b$. CSIs 39/1 to 39/3 and spring electrical contacts 38/1 to 38/3 are assembled on, and electrically coupled to, PCB assembly 51$b$. Contacts 56/2 of flat cable 56 are also coupled to PCB assembly 51$b$, in order to allow activation of scanning signals, guiding signals and error signals, by scanning system 20 (FIG. 2A). Connector 56/1 allows connecting PCB 51$b$ to a corresponding Scanning System using flat cable 56. Connector latch 56/3 is used for securing the connection between flat cable 56 and connector 56/1.

Figure 2C:
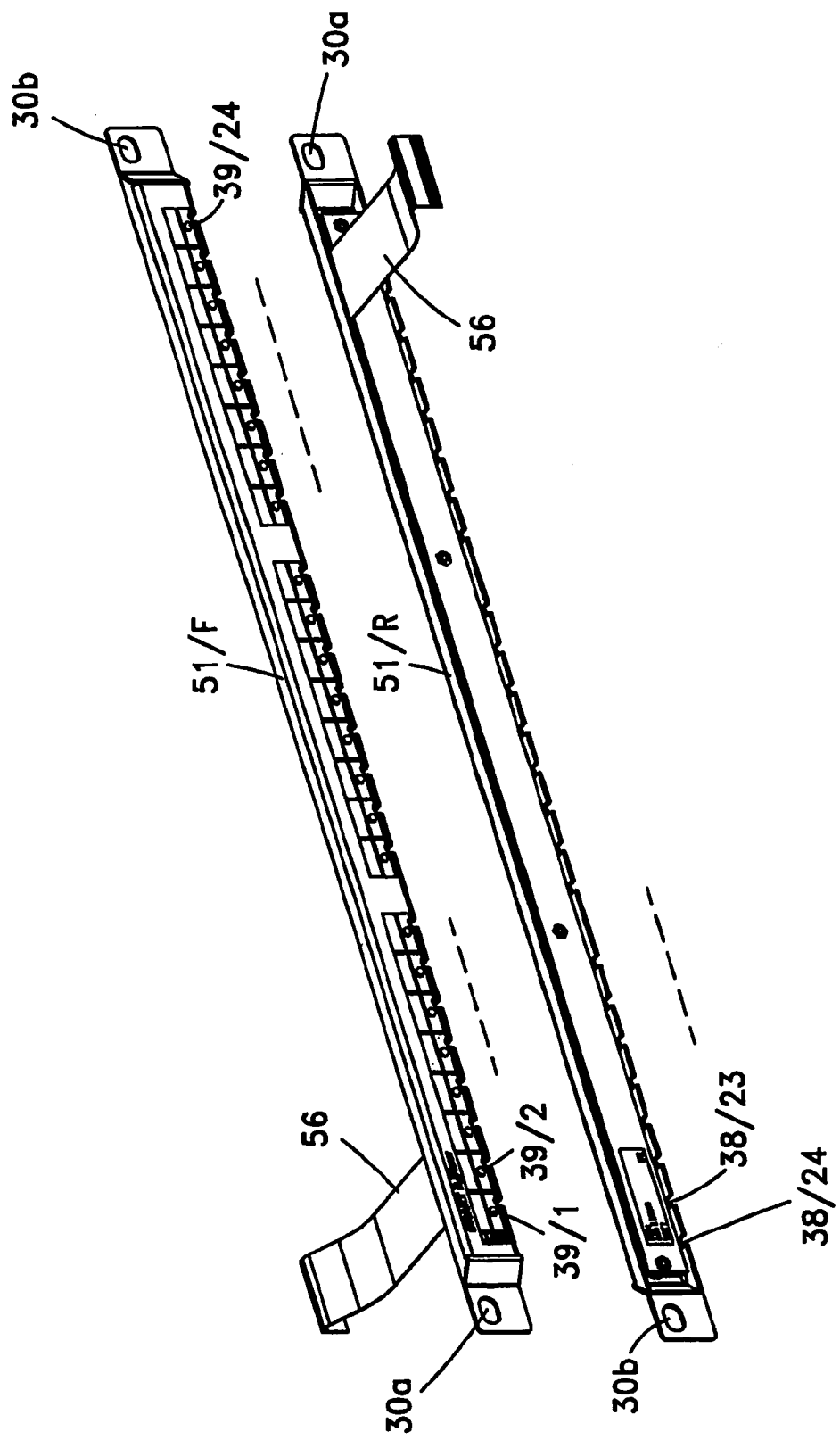
FIG. 2C illustrates the front and rear views of the adapter panel shown in FIG. 2A.

FIG. 2C illustrates the front and rear views of the adapter panel shown in FIG. 2A. Reference numerals 51/F and 51/R designate the front view and the rear view, respectively, of the adapter panel 51 (FIG. 2A).

Figure 2E:
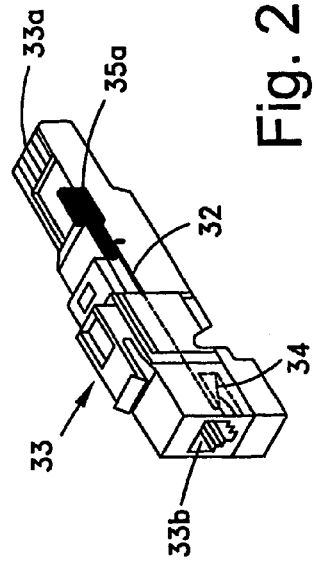
FIG. 2E schematically illustrates an adapter plug, according to one aspect of the present invention.
Figure 2D:
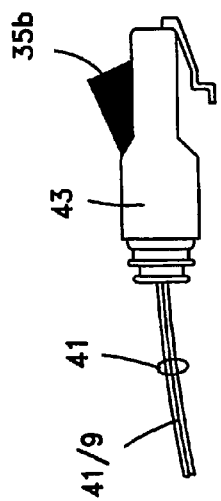
FIG. 2D illustrates an Upgraded Plug that is connected to one end of an Upgraded Patch Cord (UPC), according to a preferred embodiment of the present invention.

FIG. 2D illustrates an Upgraded Plug that is connected to one end of an Upgraded Patch Cord (UPC), according to a preferred embodiment of the present invention. To UPC 41 is coupled only one Upgraded Plug (i.e., upgraded plug 43). However, it should be obvious that another Upgraded Plug (not shown), which is identical to upgraded plug 43, is coupled to the other end (not shown) of UPC 41, which includes data conductors and a scanning conductor (e.g., 41/9), which is intended to be utilized by scanning system 20 (FIG. 2A) for determining the connectivity status. Each Upgraded Plug (only one shown, 43) includes an electrical (external) scanning contact 35$b$. However, the electrical scanning contact may be an internal scanning contact (see, for example, reference numeral 41$a$/1, in FIG. 4), or, it may include both types of electrical scanning contacts (i.e., internal and external). Both scanning contact (one of which is shown—35$b$) are electrically coupled to, e.g., scanning wire 41/9, and provide electrical contacts with the respective electrical contact 38/$i$ (i=1 to 24, FIG. 2A), in order to ensure electrical continuity of the scanning path, which includes, per UPC, two corresponding electrical contacts such as contacts 38/1 (FIG. 2A) and two scanning contacts, such as scanning contact 35$b$ (FIG. 2D), associated with the same UPC's scanning wire.

Figure 1B:
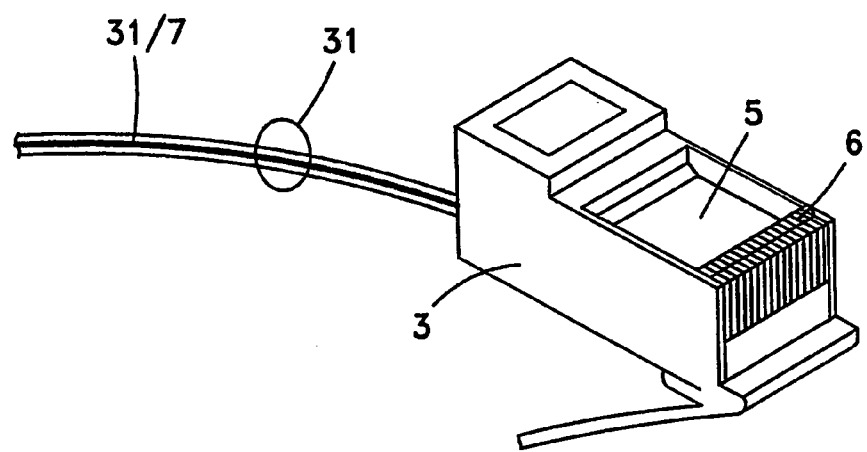
FIG. 1B (prior art) illustrates an exemplary standard 8-conductor/contact cable/plug, largely used in cabling systems.

FIG. 2E schematically illustrates an adapter plug, according to one aspect of the present invention. Adapter plug 33 is utilized by scanning system 20 (not shown) only in the initialization phase, in which the initial connectivity status of each one of the patch panels is determined. After completion of the initialization phase, adapter plug 33, and its associated patch cord, such as patch cord 31 (FIG. 1$b$), is replaced by new type of patch cords (UPCs) similar to UPC 41 (FIG. 2D). Adapter plug 33 is capable of mating, via its first end (33$b$)—being an adaptation socket, with plugs such as plug 3 (FIG. 1$b$), and with sockets, such as socket 37/1 (FIG. 1$a$), via its second end (33$b$)—being an adaptation plug, in order to allow scanning system 20 (FIG. 2A) to be initialized with the current connectivity status of the patch panels.

After mating plug 3 (FIG. 1$b$) with adapter plug 33, one of its wires, e.g., wire 31/7 (FIG. 1$b$), is utilized as a scanning wire, by electrically connecting it, via electrical contact 34 (FIG. 2E), to conducting lead 32, which is electrically connected to external (scanning) electrical contact 35$a$, which is designed to slightly push inwards the corresponding spring-like electrical contact 38/$i$ (i=1 to 24, see FIG. 2B for example), to ensure electrical continuity of the scanning path.

After a database, which is contained within scanning system 20 (FIG. 2A), is initialized with the current connectivity status of the patch panels, each one of the patch cords is replaced by a corresponding UPC. There are several ways to perform the latter task. For example, a technician could present to scanning system 20 a work plan/schedule specifying the preferred order at which the connected patch cords should be replaced. Accordingly, scanning system 20 will transmit signals (hereinafter referred to as 'Guiding Signals'—GSIGs) to the two corresponding CSIs (e.g., CSI 39/2 in FIG. 4, and a CSI in another patch panel—not shown) associated with the (same) patch cord(s) that is to be removed, indicating to the technician the corresponding sockets (e.g., 37/2) from which the corresponding adapter plugs, such as adapter plug 33 (FIG. 2E), should be removed, and to which a new UPC should be inserted instead.

After having all of the patch cords replaced by corresponding UPCs, the patch cord could be managed by scanning system 20, which utilizes the adapter panel (37) and the UPCs. According to one aspect of the invention, interconnection changes are performed by a technician and the scanning system detects these changes by transmitting/receiving scanning signals, after which a database, which is contained in the scanning system, is updated. If, however, the technician inserts an UPC's end to an incorrect socket, the scanning system will indicate to the technician the erroneous connections/sockets by sending error signal(s) to the corresponding CSI. According to a second aspect of the invention, the technician presents to the scanning system a work plan/schedule, specifying the required interconnection changes and the preferred order in which these changes should be performed. Accordingly, scanning system 20 sends a corresponding GSIG to the corresponding CSI, indicating to the technician the current socket from, or to which an UPC's plug is to be removed/added. After the latter (current) interconnecting change is completed, scanning system 20 sends a GSIG to the next (current) CSI (i.e., according to the work plan/schedule), etc., until all of the required interconnecting changes are performed.

Figure 3:
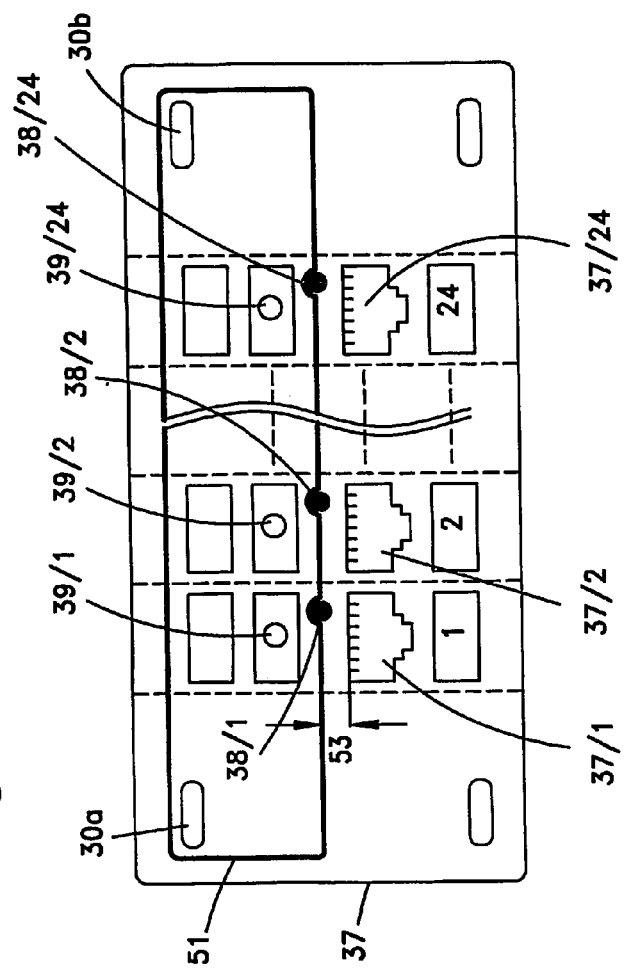
FIG. 3 schematically illustrates attaching the adapter panel of FIGS. 2A to 2C to a patch panel, according to a preferred embodiment of the present invention.

FIG. 3 schematically illustrates a patch panel, on which the adapter panel of FIG. 2A is mounted, according to a preferred embodiment of the present invention. Panel 37 is a patch panel, on which adapter panel 51, containing spring electrical contacts (38/1 to 38/24) and CSIs (39/1 to 39/24), is mounted. Adapter panel 51 has an appropriate contour line and spacing 53, for allowing adapter panel 51 to be conveniently mounted on patch panel 37. The flexibility of e.g., spring electrical contact 38/1 ensures electrical continuity with scanning contact 35b (FIG. 2D). Alternatively, spring electrical contact 38/1 is a rigid contact, and scanning contact 35b is a corresponding flexible contact.

Figure 4:
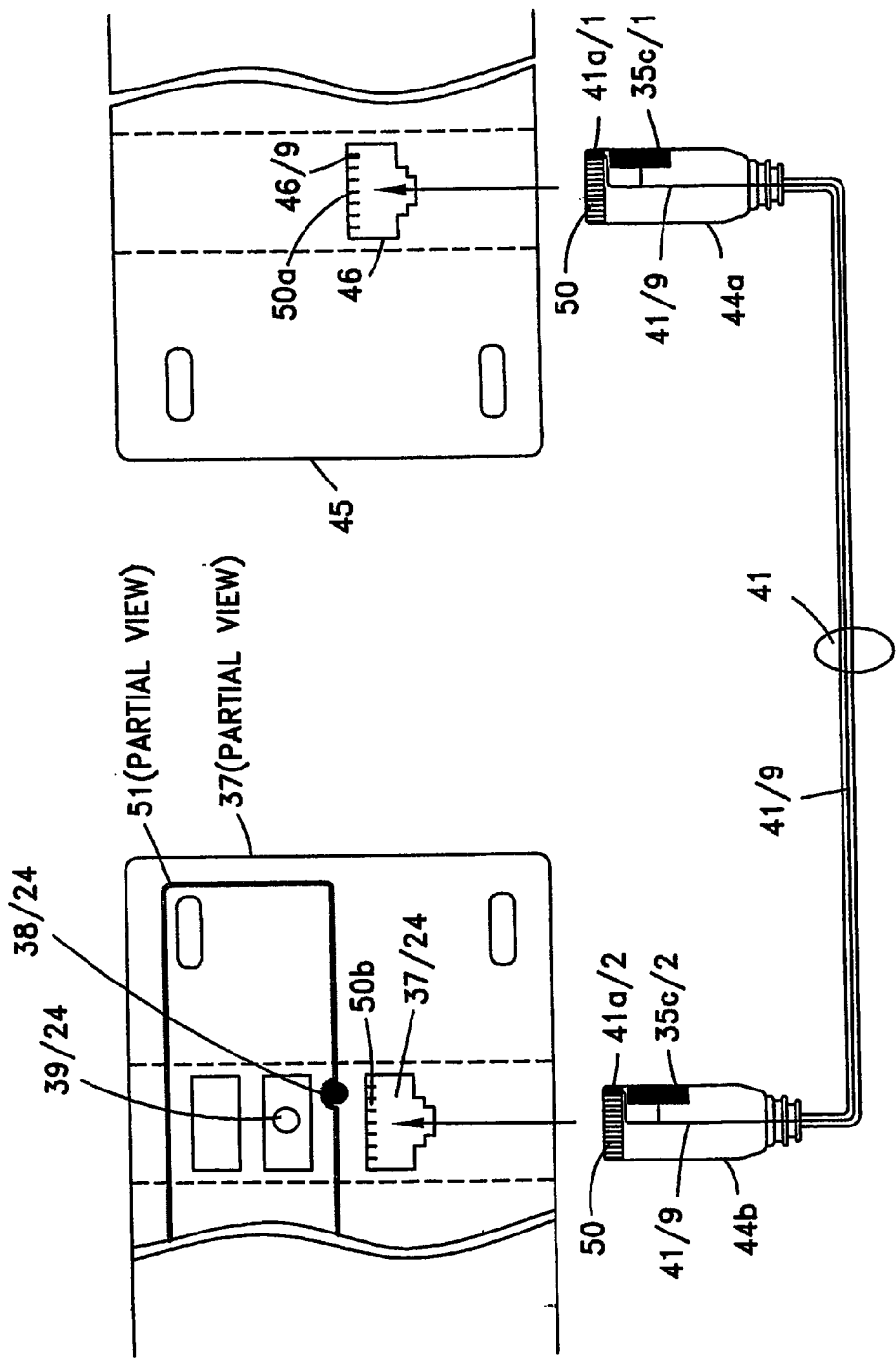
FIG. 4 schematically illustrates interconnecting between a socket in an upgraded patch panel and a socket suitable for transmission of scanning signals, according to another embodiment of the present invention.

FIG. 4 schematically illustrates interconnecting between a socket in an upgraded patch panel (i.e., a socket that is not suitable for transmission of scanning signals) and a socket suitable for transmission of scanning signals, according to another embodiment of the present invention. The combination of patch panel 37 and adapter panel 51 forms an upgraded patch panel, the structure and functionality of which are explained above in connection with the respective Figures. Socket 46 includes data/voice contacts 50a, and an integral scanning contact 46/9, thereby making socket 46 suitable for transmission of scanning signals. Patch panel 45 may include a plurality of sockets such as socket 46. Socket 46 has a functionality that is equivalent to the functionality of the combination of socket 37/24, which includes only data/voice contacts 50b, and scanning contact 38/24. Data/voice contacts 50 are intended to mate with the respective data/voice contacts 50a, or 50b.

Plug 44a is connected to one end of cable 41 and it includes data/voice contacts, which are intended to electrically interact with the respective data/voice contacts of socket 46, and an internal scanning contact 41a/1, which is intended to electrically interact with the respective scanning contact in socket 46 (i.e., with scanning contact 46/9). Scanning wire 41/9 is connected to scanning electrical contact 41a/1, thereby forming a scanning path with scanning electrical contact 46/9; i.e., whenever plug 44a is mated with socket 46. Plug 44a also includes an external electrical scanning contact 35c/1, the shape of which is similar to the shape of external electrical contact 35b, in FIG. 2D. However, electrical contact 35c/1 is inoperable whenever plug 44a mates with socket 46; i.e., electrical contact 35c/1 is not utilized as part of the scanning path.

The structure of plug 44b, which is connected to the other end of cable 41, is identical to the structure of plug 44a. External electrical contact 35c/2 mates with scanning electrical contact 38/24 whenever plug 44b mates with socket 37/24. Scanning contact 41a/2 has no function whenever plug 44b mates with socket 37/24; i.e., electrical contact 41a/2 is inoperable (i.e., it is not utilized as part of the scanning path).

Of course, plug 44b, having scanning contact 41a/2, can mate with socket 46, in which case the scanning path will be established by mating contact 41a/2 and contact 46/9. Likewise, plug 44a, having external scanning contact 35c/1, can mate with socket 37/24, in which case the scanning path will be established by mating contact 35c/1 with contact 38/24. Accordingly, the scanning path includes electrical contact 38/24, contact 35c/2 (or 35c/1), scanning wire 41/9, contact 41a/1 (or 41a/2) and contact 46/9.

FIG. 4 illustrates interconnection between different types of sockets/patch panels. However, plug 44a (or 44b) is characterized by having a structure that allows interconnection also between sockets of the same type; i.e., between two sockets that are included in upgraded patch panels, or between two sockets being suitable for transmission of scanning signals. Accordingly, a scanning path may include a UPC's internal scanning wire and two corresponding external scanning contacts (e.g., contacts 35c/1 and 35c/2), or, a UPC's internal scanning wire and two corresponding internal scanning contacts (e.g., 41a/1 and 41a/2), respectively. FIG. 4 illustrates one option, according to which the scanning path includes a UPC's internal scanning wire (i.e., 41/9), one external scanning contact (i.e., 35c/2) and one internal scanning contact (i.e., 41a/1)

Management of a cabling system consisting of both types of patch panels (i.e., patch panels such as patch panel 45 and upgraded patch panel 37) is carried out by employing a corresponding scanning system essentially in the same manner as described in connection with other embodiments of the present invention.

Of course, it is clear to any person skilled in the art that the transmission or reception of scanning signals can be carried our similarly using several contacts in the adapter panel and in the adapter plug, rather than a single contact. This implies using patch cords having several corresponding wires, for determining one or more scanning paths. More than one electrical scanning path can be used for redundancy, as well as for composite scanning systems that use different paths for transmission and reception.

The above examples and description have of course been provided only for the purpose of illustration, and are not intended to limit the invention in any way. As will be appreciated by the skilled person, the invention can be carried out in a great variety of ways, employing more than one technique from those described above, all without exceeding the scope of the invention.

The invention claimed is:

1. A system for automatically obtaining the connectivity status, or map, of a cabling system in data and/or voice networks, which includes patch panels, each of which contains sockets, which sockets are data and/or voice ports to which one or more patch cords are connected, and for managing said cabling system by means of the obtained connectivity status, or map, said system comprising patch panels of the existing cabling system and a retrofit kit, said retrofit kit comprising:

a) a plurality of upgraded patch cords for replacement of respective used patch cords, each of said upgraded patch cords including one or more internal scanning wires and one or more electrical scanning contacts in electrical contact with the corresponding internal scanning wires, one or more scanning paths being formed in each of the upgraded patch cords by means of said internal scanning wires and one or more scanning contacts for allowing scanning signals to be forwarded by a scanning system;

b) a plurality of adapter panels for facilitating cabling system management, each of said adapter panels being attached to a respective patch panel and including, for any given socket in the respective patch panel, a connectivity status indicator and one or more electrical contacts, each of said electrical contacts being intended to mate with a corresponding electrical scanning contact of an upgraded patch cord, said scanning signals being forwarded to said electrical contacts from said scanning system or being forwarded to said scanning system from a respective scanning path, whereby a scanning signal received by one or more electrical contacts is processed to generate data that represents the current connectivity status, or map, of the cabling system; and c) a plurality of adapter plugs for initializing the scanning system with a first connectivity status, or map, one of said adapter plugs being connected to each end of a used patch cord and to an adapter panel, each of said adapter plugs comprising an adaptation socket, an adaptation plug, and one or more external electrical contacts connected to corresponding conductors associated with a used patch cord to which the adapter plug is attached;

wherein determination of which patch cords are to be replaced by respective upgraded patch cords and, following completion of the replacement, management of said cabling system, are effected in conjunction with said first connectivity status, or map.

2. A system according to claim 1, wherein scanning paths during initialization of the scanning system, by which scanning signals are forwarded, comprises wires included in the patch cords, said one or more conductors associated with a used patch cord, the corresponding external electrical contacts of a pair of adapter plugs, internal electrical contacts of the corresponding adapter plugs, and the corresponding electrical contacts of the adapter panel.

3. A system according to claim 1, wherein whenever a connectivity change is required in upgraded patch cords used by the cabling system, the scanning system forwards to the respective connectivity status indicators indication signals, said signals being guiding signals that indicate from, or to, which socket(s) a used upgraded patch cord should be disconnected, or connected, respectively, and, whenever a new upgraded patch cord should be added to the cabling system, guiding signals that indicate to which sockets the new upgraded patch cord should be connected.

4. A system according to claim 1, wherein whenever the scanning system identifies erroneous connections, or disconnections, said scanning system forwards to the respective connectivity status indicators indication signals, said signals being error signals, for indicating the erroneous sockets associated with said connections or disconnections.

5. A system according to claim 1, wherein the adapter panel includes a Printed Circuit Board (PCB), on which the electrical contacts and the connectivity status indicators are installed, and the PCB is connected to the scanning system via a flat cable, which allows said scanning system to transmit and forward scanning signals and guiding/error signals, respectively.

6. A system according to claim 1, wherein the connectivity status indicator is a Light Emitting Diode (LED).

7. A system according to claim 1, wherein one or more electrical scanning contacts are externally and/or internally integrated to the upgraded plug.

8. A system according to claim 1, wherein at least one electrical contact is a spring contact, or rigid contact, and at least one electrical scanning contact is rigid contact or flexible, respectively, for ensuring electrical continuity between the electrical contact and the electrical scanning contact.

9. A method for automatically obtaining the connectivity status, or map, of a cabling system in data, or voice, networks, which includes patch panels, each of which containing sockets, said sockets being data or voice ports, to which one or more patch cords are connected, and for utilizing the obtained connectivity status, or map, for managing said cabling system, comprising:

a) Providing a plurality of adapter panels, and attaching each one of said adapter panels to a respective patch panel, each one of said adapter panels including, for any given socket in the respective patch panel, one or more electrical contacts and a connectivity status indicator;

b) Providing a plurality of adapter plugs for temporarily utilizing (used) patch cords for generating a first (initial) connectivity status;

c) Disconnecting said adapter plugs and said used patch cords from the cabling system;

d) Forwarding guiding signals to the respective connectivity status indicators, according to said initial connectivity status, for indicating which upgraded patch cord(s) is (are) to be connected;

e) Emitting scanning signals from a scanning system to a first set of electrical contacts, according to a predetermined schedule, and forwarding said scanning signals to respective scanning paths;

f) Receiving said scanning signals from said respective scanning paths by a second set of electrical contacts, and forwarding the received scanning signals to said scanning system, thereby completing transmission of said scanning signals;

g) Processing, by said scanning system, said received scanning signals, the processing including identifying the first and second ends of each one of the upgraded patch cords, generating and storing first data that represents the current connectivity status, or map, of the cabling system; and h) Continuously, or whenever required, repeating steps e) to g).

10. A method according to claim 9, wherein one or more electrical contacts mate with respective electrical scanning contacts, whereby corresponding scanning signals are allowed to be transmitted or received via the respective electrical scanning contact.

11. A method according to claim 9, wherein a connectivity status indicator indicates changes that are required in the connectivity status, and/or erroneous connections or disconnections, by forwarding, by the scanning system, corresponding guiding and/or error signals.

12. A method according to claim 9, wherein a database for management of the cabling system after the replacement of the used patch cords by the upgraded patch cords is generated by performing the following steps:
   a) Mating an adapter plug to each end of a used patch cord and to an adapter panel;
   b) Utilizing, in each one of said used patch cords, a data wire as a scanning wire, which is electrically connected, via the corresponding internal contacts, to the corresponding external scanning contacts, for allowing transmitting or receiving scanning signals, via a respective scanning path, which comprises the scanning wire, two corresponding internal contacts and external contacts of the respective adapter plug;
   c) Emitting scanning signals from said scanning system to a third set of respective electrical contacts, according to a predetermined schedule, said scanning signals being forwarded from said third set of electrical contacts to the respective scanning paths;
   d) Receiving said scanning signals from said scanning paths by a fourth set of respective electrical contacts, and forwarding the received scanning signals to said scanning system; and
   e) Processing, by said scanning system, the received scanning signals, the processing including identifying the first and second ends of each one of the connected (used) patch cords, and generating and storing initial data that represents the current initial connectivity status, or map, of said cabling system.

13. A method according to claim 9, wherein the guiding signals are used for replacing some, or all, of the used patch cords by corresponding upgraded patch cords, each upgraded patch cord including an internal scanning wire, each end of which being in electrical contact with a respective electrical scanning contact of a respective upgraded plug, an upgraded plug being connected to the respective end of said upgraded patch cord, said internal scanning wire and two corresponding electrical scanning contacts forming a scanning path, via which scanning signals are forwarded by said scanning system.

14. A method according to claim 9, wherein steps e) to g) are employed automatically or manually, and according to a chosen schedule.

15. A method according to claim 9, wherein managing of the cabling system includes identifying erroneous connections, or disconnections in the connectivity status, comprising:
   a) Comparing first stored data with second stored data representing wanted connectivity status, for allowing identification of unwanted changes in said connectivity status, said wanted connectivity status is obtained by connecting upgraded patch cords to corresponding sockets, employing the scanning system and indicating to the scanning system that the scanning results represent the wanted connectivity status, or, alternatively, the wanted connectivity status may be represented by a corresponding data that is pre-stored in a corresponding storage array; and
   b) Whenever an unwanted change(s) in the connectivity status is (are) identified, sending corresponding error signal(s) to the respective connectivity status indicators.

16. A method according to claim 9, wherein managing of the cabling system includes guiding a person through wanted changes in the connectivity status, comprising utilizing pre-stored data, which represent the wanted new connectivity status, for causing the scanning system to forward guiding signals, according to wanted order, to the respective connectivity status indicators (CSIs), said wanted order is predetermined by a person, who makes the physical changes in said connectivity status, or by the scanning system.

17. A method according to claim 16, wherein the next scheduled CSI, which is to be activated according to the wanted order, and which is related to the next scheduled change, is activated only after the wanted current connectivity change is successfully completed.

18. A method according to claim 17, wherein in order to determine whether a wanted connectivity change is successfully completed, the scanning system transmits scanning signals and checks, by employing comparison process, whether the actual current change matches the expected/scheduled current change, after which said scanning system forwards, in the event of mismatch, corresponding error signal(s), or, otherwise, the next scheduled connectivity status indicator is activated by said scanning system.

19. A method according to claim 10, wherein the electrical scanning contact is external, or internal, or both.

20. A method according to claim 9, wherein the electrical contact is a spring contact, or rigid contact, and the electrical scanning contact is rigid contact or flexible, respectively, for ensuring electrical continuity between the electrical contact and the electrical scanning contact.

* * * * *